(12) United States Patent
Handa et al.

(10) Patent No.: US 9,181,968 B2
(45) Date of Patent: Nov. 10, 2015

(54) GROMMET

(75) Inventors: Kazuya Handa, Hamamatsu (JP); Mitsuhide Dempo, Sagamihara (JP)

(73) Assignee: NIFCO INC., Yokohama-Shi, Kanagawa (JP)

( * ) Notice: Subject to any disclaimer, the term of this patent is extended or adjusted under 35 U.S.C. 154(b) by 239 days.

(21) Appl. No.: 13/807,131

(22) PCT Filed: Jun. 27, 2011

(86) PCT No.: PCT/JP2011/064718
§ 371 (c)(1),
(2), (4) Date: Feb. 19, 2013

(87) PCT Pub. No.: WO2012/002339
PCT Pub. Date: Jan. 5, 2012

(65) Prior Publication Data
US 2013/0149066 A1 Jun. 13, 2013

(30) Foreign Application Priority Data
Jul. 1, 2010 (JP) .................... 2010-151057

(51) Int. Cl.
*F16B 13/06* (2006.01)
*F16B 19/10* (2006.01)

(52) U.S. Cl.
CPC .............. *F16B 19/10* (2013.01); *F16B 19/1081* (2013.01)

(58) Field of Classification Search
USPC ................. 411/57.1, 508–510, 80.1, 80.2
IPC ........................................... F16B 19/00
See application file for complete search history.

(56) References Cited

U.S. PATENT DOCUMENTS

| 4,405,272 | A | * | 9/1983 | Wollar | 411/41 |
|---|---|---|---|---|---|
| 4,840,523 | A | * | 6/1989 | Oshida | 411/48 |
| 5,163,795 | A | * | 11/1992 | Benoit et al. | 411/45 |
| 5,375,954 | A | * | 12/1994 | Eguchi | 411/48 |
| 5,568,675 | A | * | 10/1996 | Asami et al. | 24/453 |
| 5,641,255 | A | | 6/1997 | Tanaka | |
| 5,775,860 | A | * | 7/1998 | Meyer | 411/46 |
| 6,322,305 | B1 | * | 11/2001 | Bantle | 411/41 |
| 6,984,096 | B2 | * | 1/2006 | Kraus | 411/48 |

(Continued)

FOREIGN PATENT DOCUMENTS

| JP | H11-270525 A | 10/1999 |
|---|---|---|
| JP | 3251775 B2 | 1/2002 |

(Continued)

OTHER PUBLICATIONS

PCT, "International Search Report for PCT/JP2011/064718", Sep. 6, 2011.
China Patent Office, "Office Action for CN 201180041012.3," Apr. 30, 2014.

*Primary Examiner* — Gary Estremsky
(74) *Attorney, Agent, or Firm* — Manabu Kanesaka

(57) ABSTRACT

An axis body includes a first abutting portion abutting against an abutted portion of a leg portion by pushing-in; and a second abutting portion which is positioned on a pushing-in backward side more than the first abutting portion. After a part of the leg portion is spread by the first abutting portion, the axis body is pushed in further, so that the other one part of the leg portion is spread. A temporary attaching device, which temporarily attaches the axis body and a main body at a position before the above pushing-in wherein one portion of the axis body is housed inside the main body, is provided.

8 Claims, 13 Drawing Sheets

(56) References Cited

U.S. PATENT DOCUMENTS

| | | |
|---|---|---|
| 7,837,225 B2* | 11/2010 | Gosis et al. ............... 280/730.2 |
| 7,862,272 B2* | 1/2011 | Nakajima ....................... 411/45 |
| 2004/0020016 A1* | 2/2004 | Yoneoka ......................... 24/297 |
| 2009/0028659 A1* | 1/2009 | Shibuya ....................... 411/57.1 |

FOREIGN PATENT DOCUMENTS

| | | |
|---|---|---|
| JP | 2006-046537 A | 2/2006 |
| JP | 4201217 B2 | 10/2008 |
| JP | 2009-030707 A | 2/2009 |

* cited by examiner (a)

(b)

(a)

(b)

(a)

(b)

(a)

(b)

GROMMET

RELATED APPLICATIONS

The present application is National Phase of International Application No. PCT/JP2011/064718 filed Jun. 27, 2011, and claims priority from Japanese Application No. 2010-151057 filed Jul. 1, 2010.

FIELD OF TECHNOLOGY

The present invention relates to an improvement of a grommet comprising an axis body and a main body wherein the axis body is pushed in.

BACKGROUND ART

There is a grommet also called a pin grommet and the like comprising the axis body and the main body wherein the axis body is pushed in. (See Patent Document 1) Such a grommet has a structure such that from a state wherein a leg portion of the main body is inserted and passed through a through-hole formed in a fastening object, the axis body is pushed into the main body so as to spread such leg portion, and fastened to such a fastening object. In the grommet described in the Patent Document 1, in an end of the axis body, there is formed a concave portion which constricts the axis body. In a state wherein the axis body has not been completely pushed into the main body, a claw portion formed inside an end of the leg portion of the main body enters into the concave portion, and the main body and the axis body are temporarily attached. However, in the grommet described in the Patent Document 1, even when the main body and the axis body are temporarily attached in such a manner, the axis body is required to be pushed into the main body while elastically deforming the leg portion of the main body up to a position wherein the aforementioned claw portion is entered into the concave portion.

PRIOR ART DOCUMENT

Patent Document

Patent Document 1: Japanese Patent No. 4201217

SUMMARY OF THE INVENTION

Problems to be Solved by the Invention

A main problem to be solved by the present invention is to allow the main body and the axis body forming this type of a grommet to be temporarily attached without causing an elastic deformation of the leg portion of the main body in a position before the axis body is pushed in.

Means for Solving the Problems

In order to achieve the aforementioned object, in the present invention, a grommet comprises an axis body, and a main body including a head portion and also leg portions spread by an elastic deformation by the axis body pushed in from that head portion side. The leg portions of the main body are split into two or more, and the leg portions include a temporary attaching device which temporarily attaches the axis body and the main body at a position before the aforementioned push-in wherein one portion of the axis body is housed inside the main body. The temporary attaching device is made as a latch-engaging portion which is formed in the axis body, and which is latched and engaged relative to a latch-engaged portion formed in a portion positioned between adjacent leg portions inside the head portion of the main body.

In the axis body, there are provided a first abutting portion which abuts against an abutted portion of the leg portions by the aforementioned push-in; and a second abutting portion which is positioned on a push-in backward side more than the first abutting portion. After one portion of the leg portions is spread by the first abutting portion, the axis body is pushed in further, so that another portion of the leg portions is spread. Also, the latch-engaging portion which becomes the temporary attaching device may be provided in a portion between a lateral face portion wherein the first abutting portion is positioned, and a lateral face portion wherein the second abutting portion is positioned, in a direction around an axis line of the axis body.

In a state wherein the first abutting portion of the axis body does not abut against the abutted portion, the leg portions do not elastically deform. Next, when the axis body is pushed in up to a position abutting the first abutting portion against the abutted portion, only one portion of the leg portions is spread by the elastic deformation. Then, until one portion of the leg portions is completely spread, the another one portion of the leg portions does not cause the elastic deformation. Then, when the axis body is pushed in up to a position of abutting the second abutting portion against the abutted portion, the another one portion of the leg portions is spread by the elastic deformation. Thereby, the grommet clamps a fastening object between the head portion and the leg portions so as to be fastened to the fastening object. Such a grommet does not allow one portion of the leg portions of the main body, and the another one portion to be spread at the same time, so that in a final fastened state, while one portion and another one portion of such leg portions are being spread together, a push-in resistance of the axis body into the main body can be controlled below a certain value. Further, in a portion which has no impact on the spread of the leg portions of the main body, the main body and the axis body can become a state (a temporary attached state) of not being separated in a stage before the leg portions of the main body are spread.

In a position wherein the axis body has been completely pushed into the main body, if the axis body is additionally provided with an additional latch-engaging portion which is latched and engaged with the latch-engaged portion, a state wherein the leg portions of the main body has been completely spread can be stably maintained by a latch and engagement with such latch-engaged portion and additional latch-engaging portion.

One of preferred embodiments is that the latch-engaging portion and the additional latch-engaging portion are made as concave portions, and that the latch-engaged portion is made as a protruding portion. In that case, among inner walls of the concave portions which become the latch-engaging portions, if an inner wall positioned on an additional latch-engaging portion side has an inclination wherein the concave portion, which becomes the latch-engaging portion, becomes shallow as it goes closer to the additional latch-engaging portion side, the latch-engaged portion can smoothly come out of the latch-engaging portion by the push-in of the axis body from the aforementioned temporary attached state.

Effect of the Invention

According to the invention, the main body and the axis body forming the grommet can be temporarily attached without producing the elastic deformation of the leg portion of the main body in the position before the axis body is pushed in.

BEST MODES OF CARRYING OUT THE INVENTION

Figure 1:
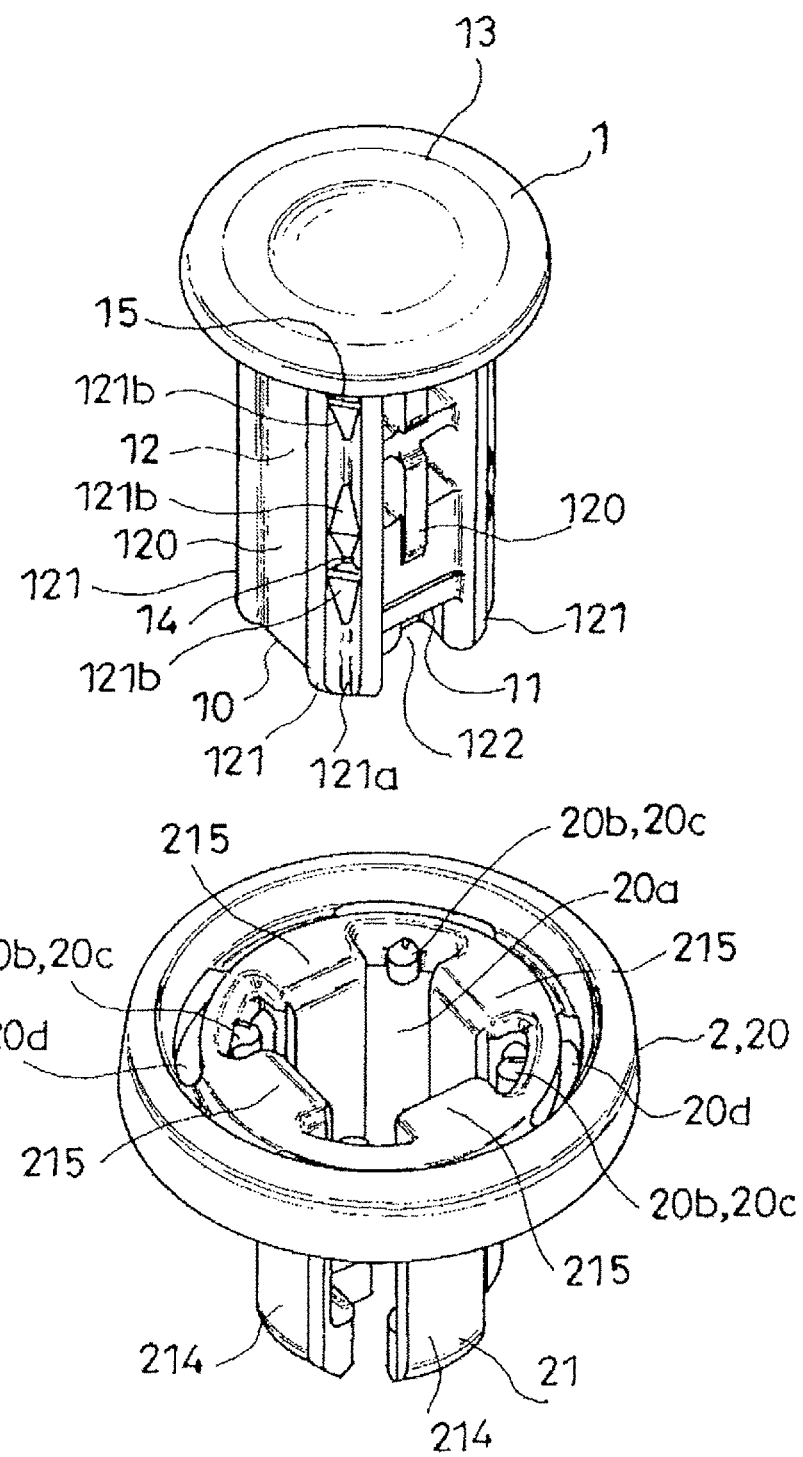
FIG. 1 is an exploded perspective view of a grommet according to the first embodiment of the present invention.
Figure 2:
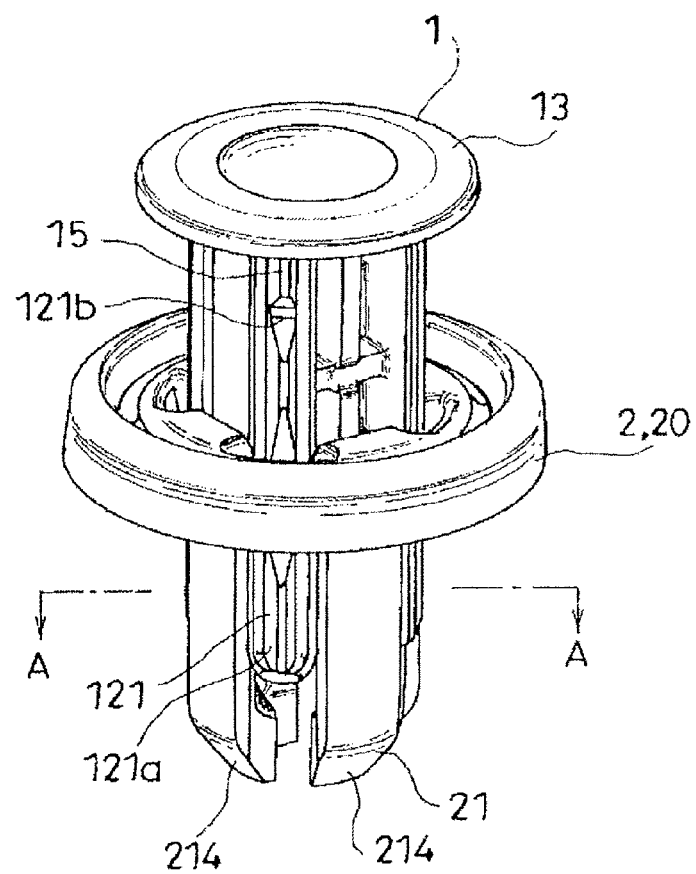
FIG. 2 is a perspective view of the grommet.
Figure 3:
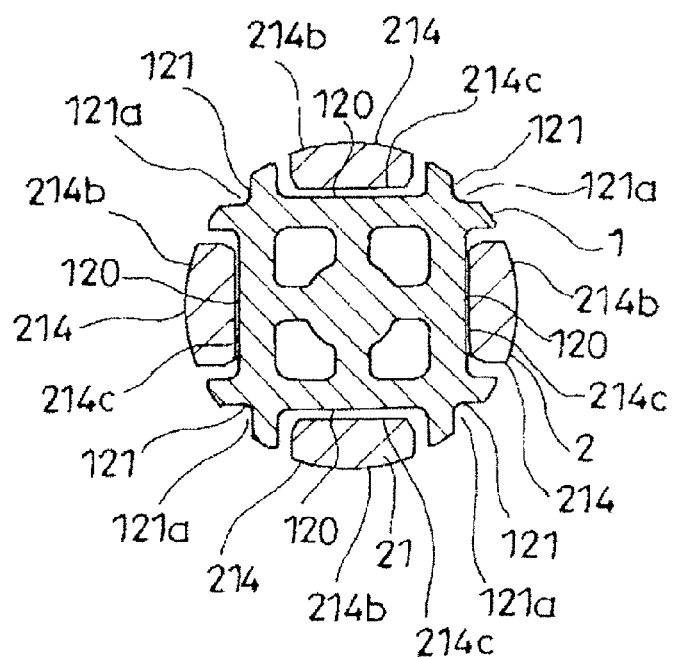
FIG. 3 is a cross-sectional view of the grommet in a corresponding position taken along a line A-A in FIG. 2.
Figure 4:
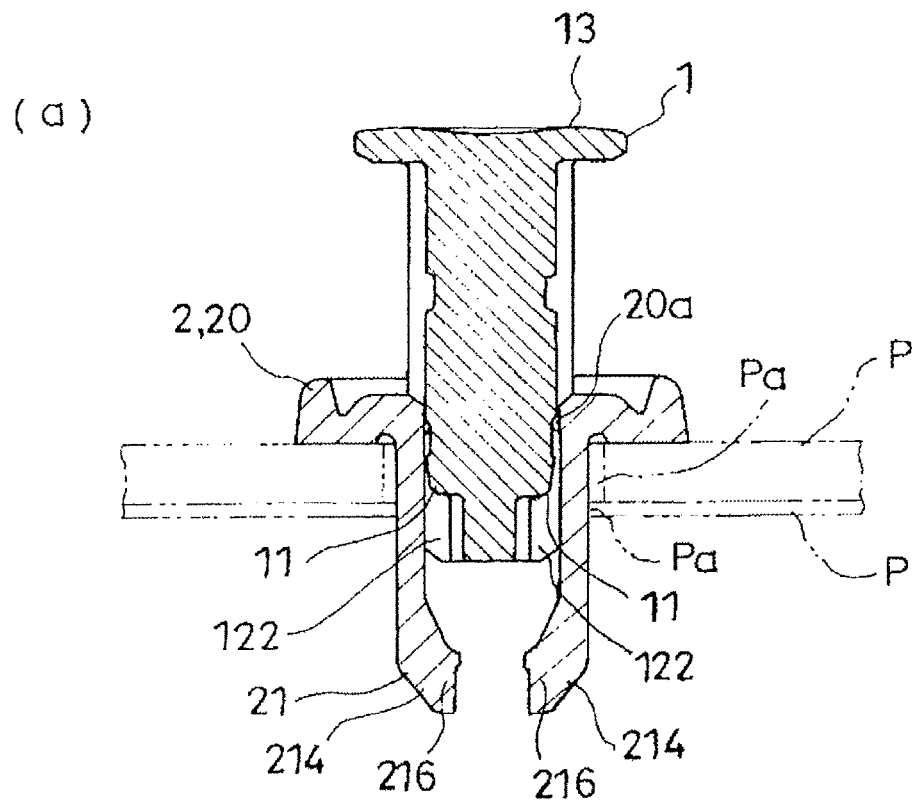
FIGS. 4(a) and 4(b) are cross-sectional structural views showing a condition wherein a main body forming the grommet has been inserted into a through-hole of a fastening object; the main body and the axis body are in a temporary attached state; and in FIG. 4(b), a cross-sectional position differs by 90 degrees relative to FIG. 4(a).
Figure 4:
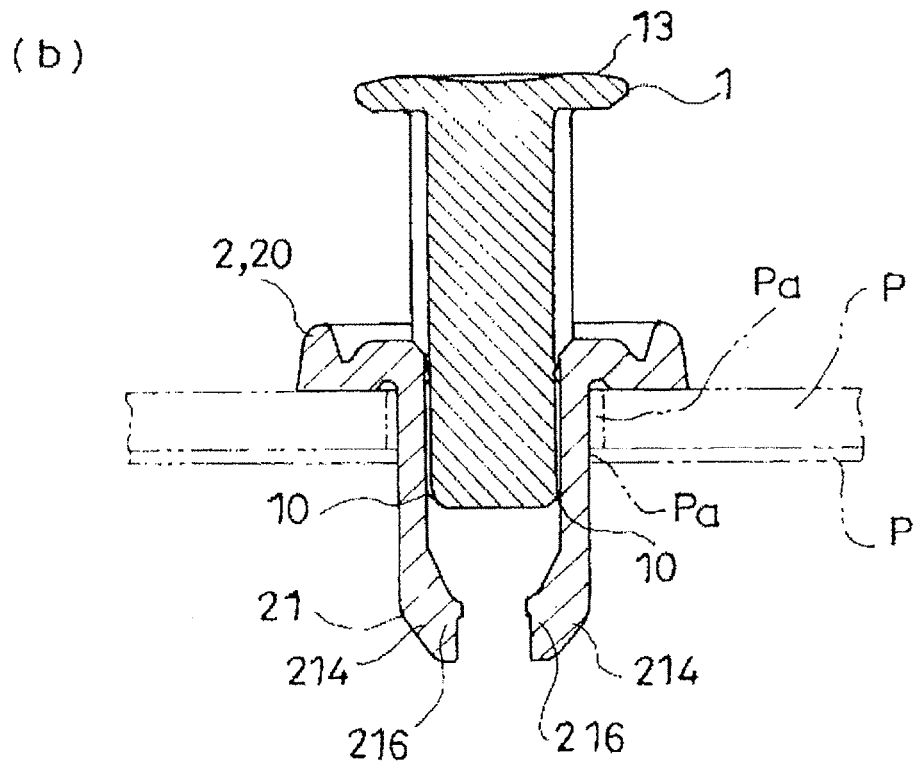
Figure 5:
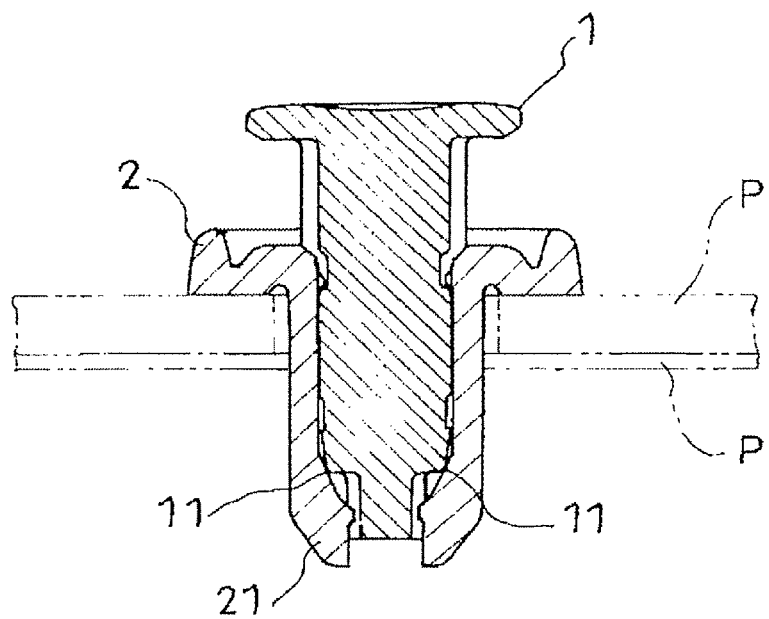
FIGS. 5(a) and 5(b) are cross-sectional structural views showing a state wherein the axis body has been started to be pushed into the main body from states shown in FIGS. 4(a) and 4(b), and in FIG. 5(b), a cross-sectional position differs by 90 degrees relative to FIG. 5(a).
Figure 5:
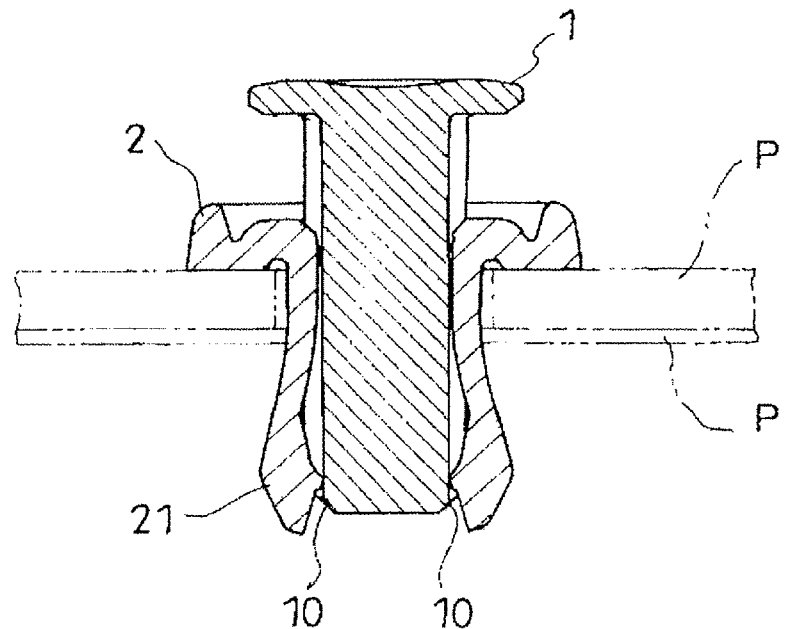
Figure 6:
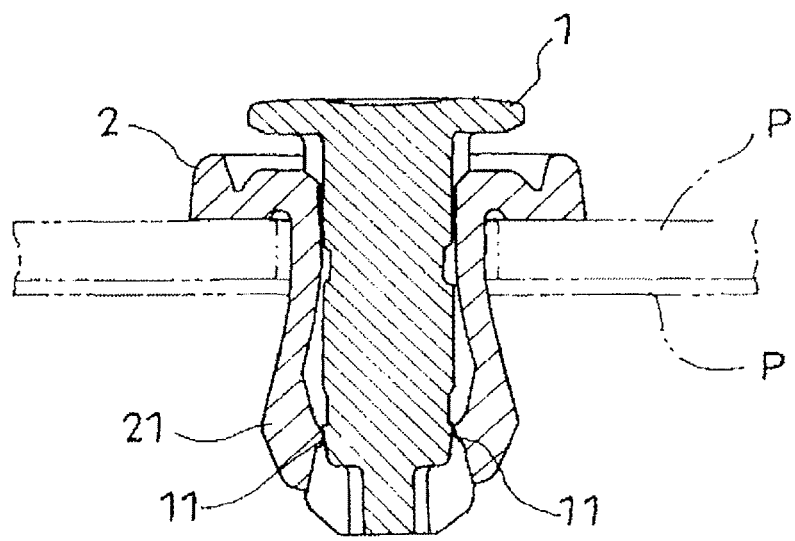
FIGS. 6(a) and 6(b) are cross-sectional structural views showing a state wherein the axis body has been pushed into the main body further from states shown in FIGS. 5(a) and 5(b), and in FIG. 6(b), a cross-sectional position differs by 90 degrees relative to FIG. 6(a).
Figure 6:
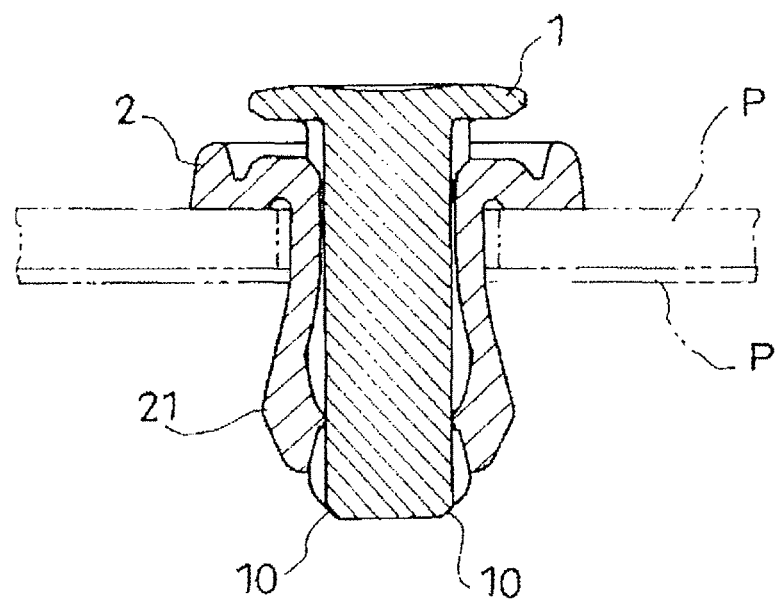
Figure 7:
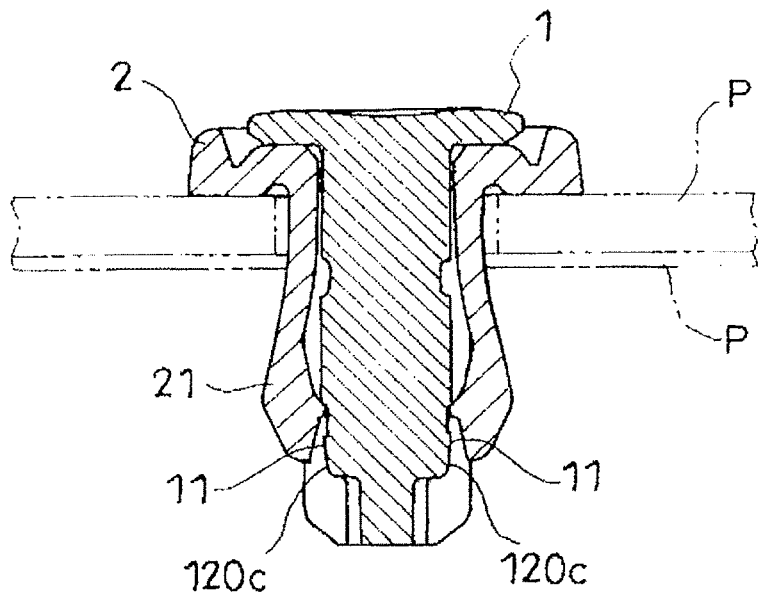
FIGS. 7(a) and 7(b) are cross-sectional structural views showing a state wherein the axis body has been completely pushed into the main body, and in FIG. 7(b), a cross-sectional position differs by 90 degrees relative to FIG. 7(a).
Figure 7:
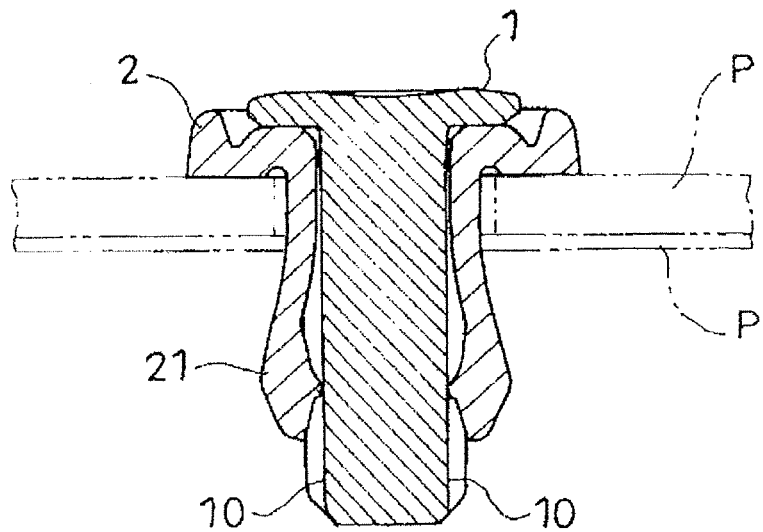
Figure 8:
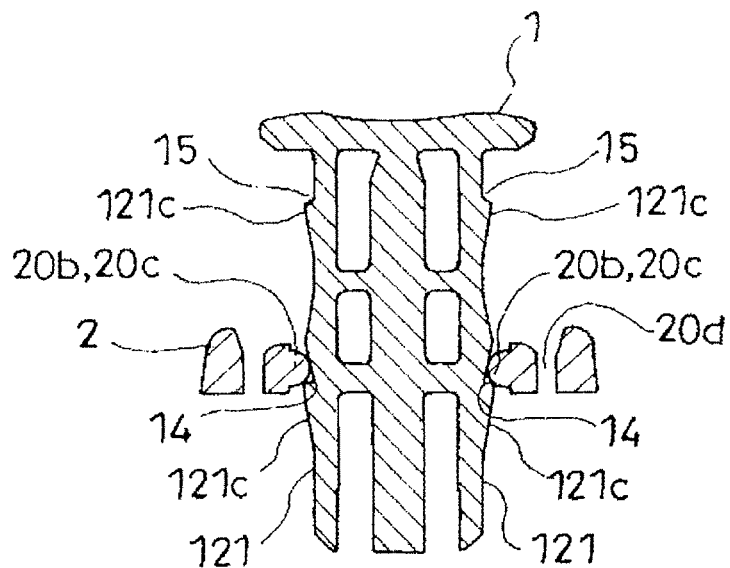
FIG. 8 is a broken end view in a position, which differs from FIGS. 4(a) and 4(b), of the grommet in the states shown in FIGS. 4(a) and 4(b).
Figure 9:
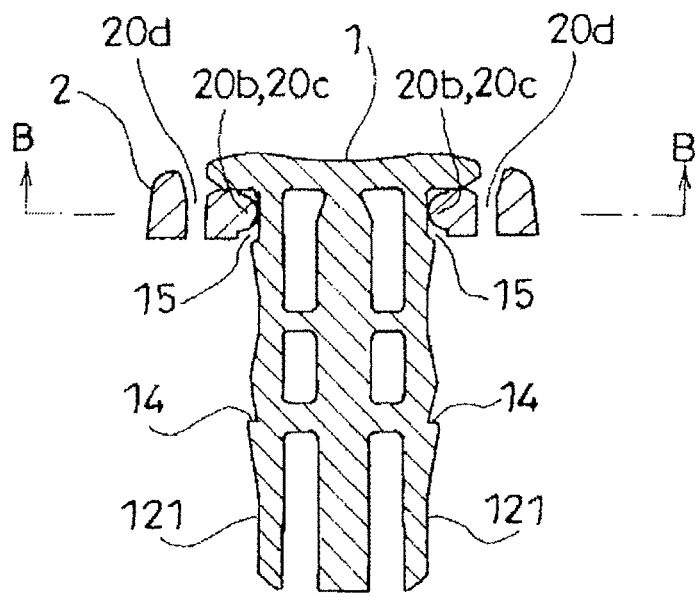
FIG. 9 is a broken end view in a position, which differs from FIGS. 7(a) and 7(b), of the grommet in the states shown in FIGS. 7(a) and 7(b).
Figure 10:
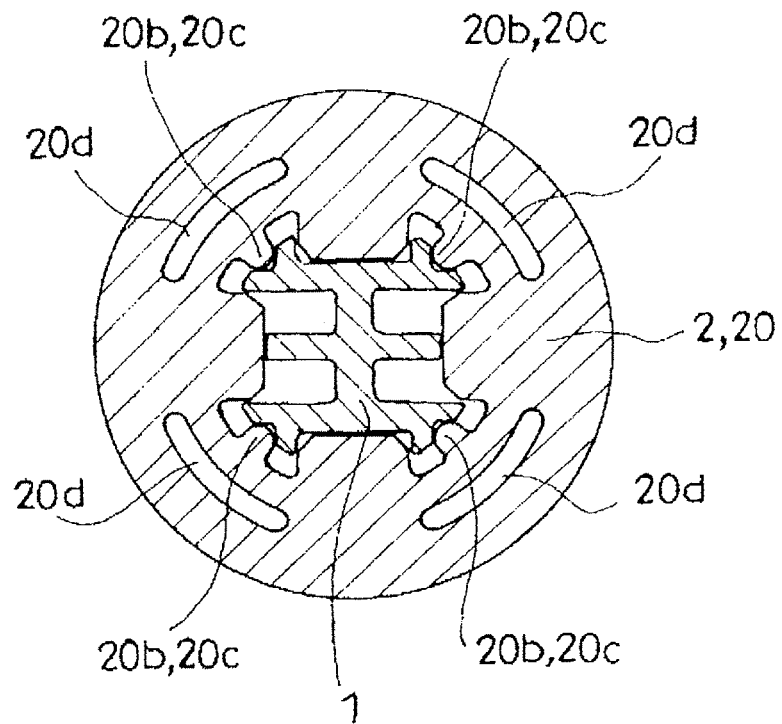
FIG. 10 is a cross-sectional view of the grommet in a corresponding position taken along a line B-B in FIG. 9.
Figure 11:
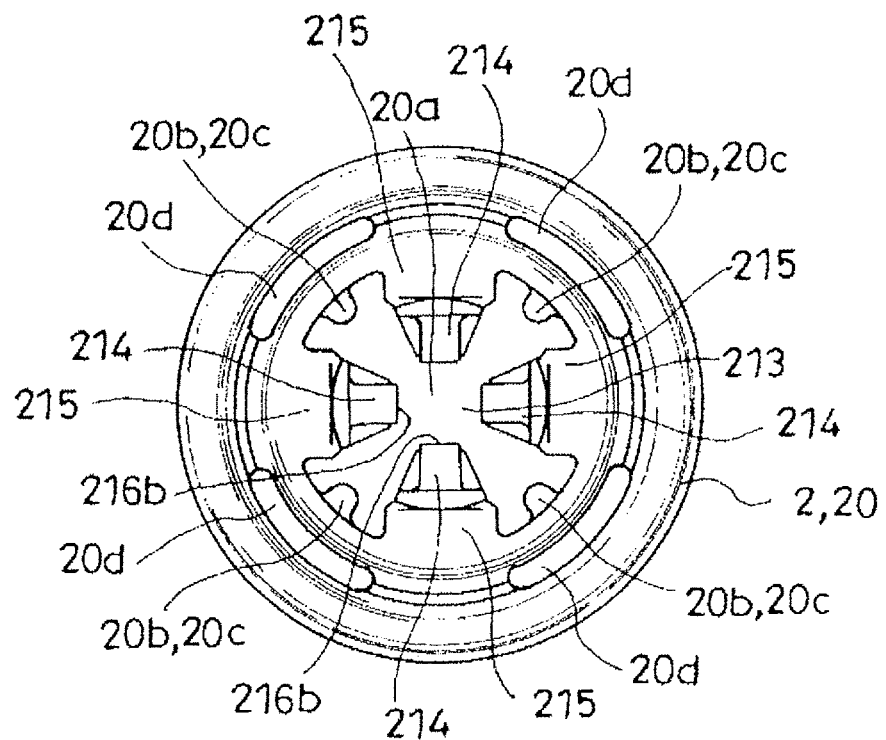
FIG. 11 is a plan view of the main body forming the grommet.
Figure 12:
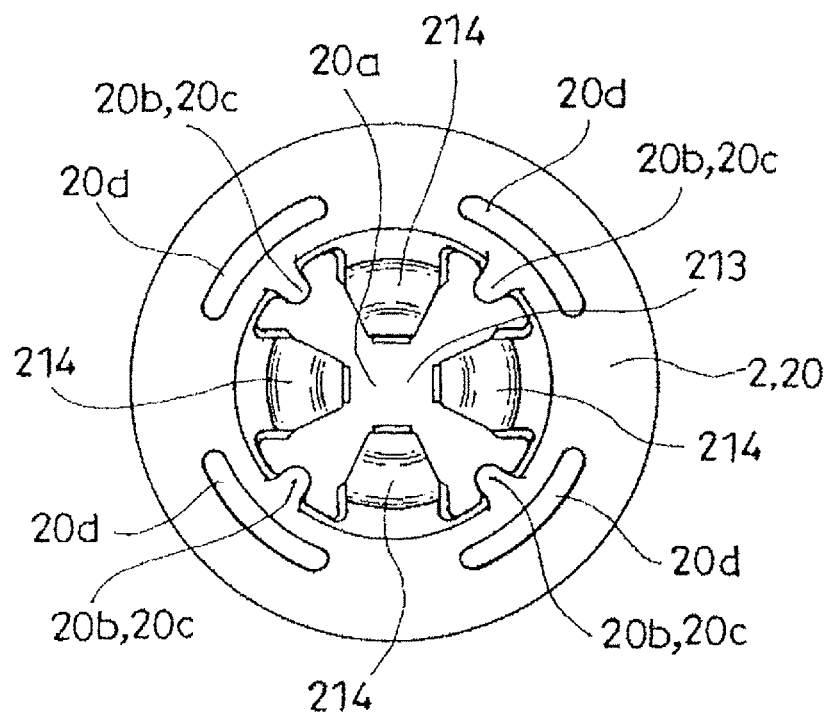
FIG. 12 is a bottom plan view of the main body forming the grommet.
Figure 13:
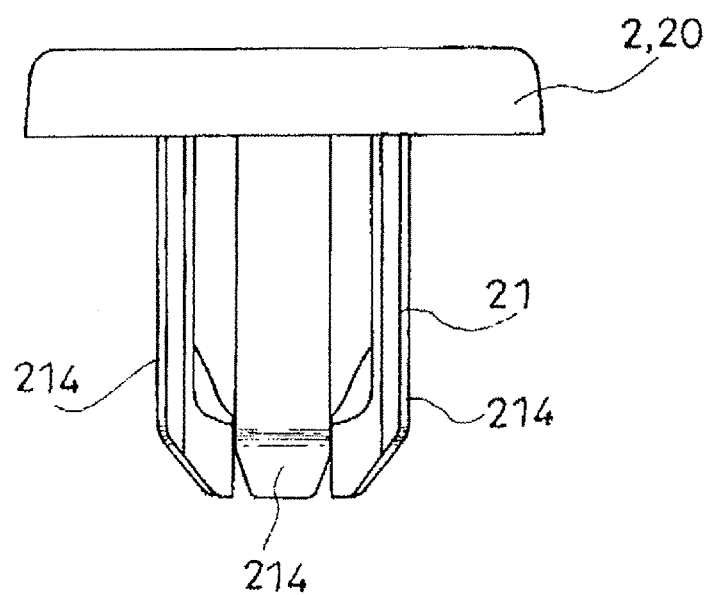
FIG. 13 is a side view of the main body forming the grommet.
Figure 14:
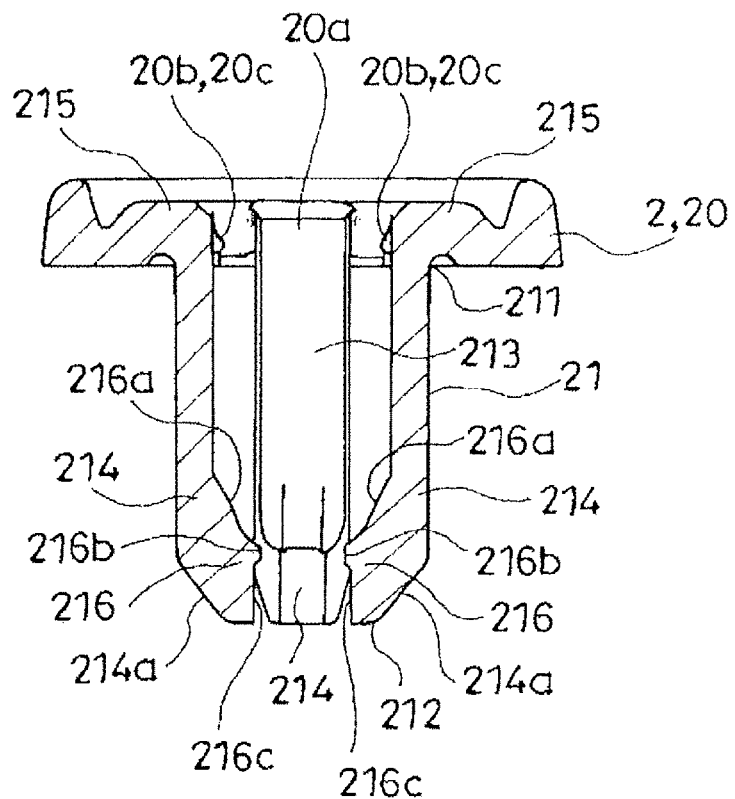
FIG. 14 is a cross-sectional view of the main body forming the grommet.
Figure 15:
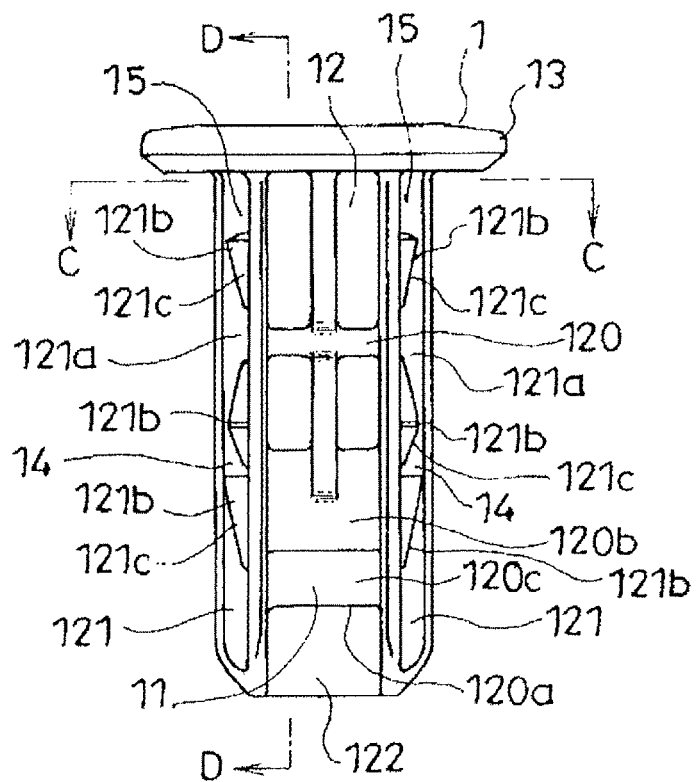
FIG. 15 is a side view of the axis body forming the grommet.
Figure 16:
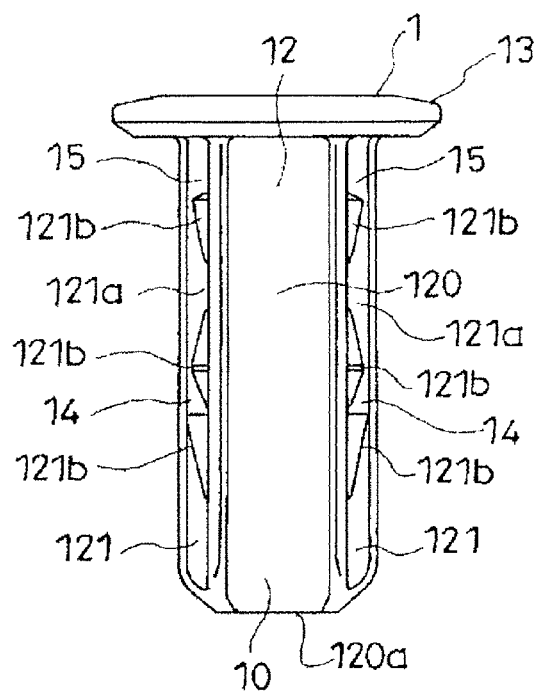
FIG. 16 is a side view of the axis body forming the grommet viewed from a direction which differs by 90 degrees from FIG. 15.
Figure 17:
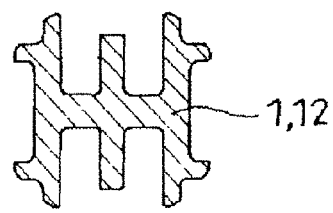
FIG. 17 is a cross-sectional view of the axis body in a corresponding position taken along a line C-C in FIG. 15.
Figure 18:
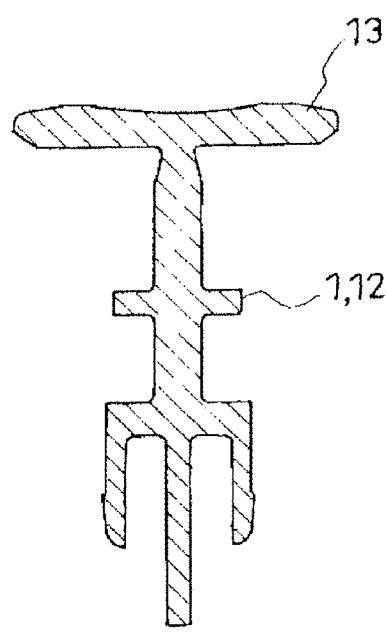
FIG. 18 is a cross-sectional view of the axis body in a corresponding position taken along a line D-D in FIG. 15.
Figure 19:
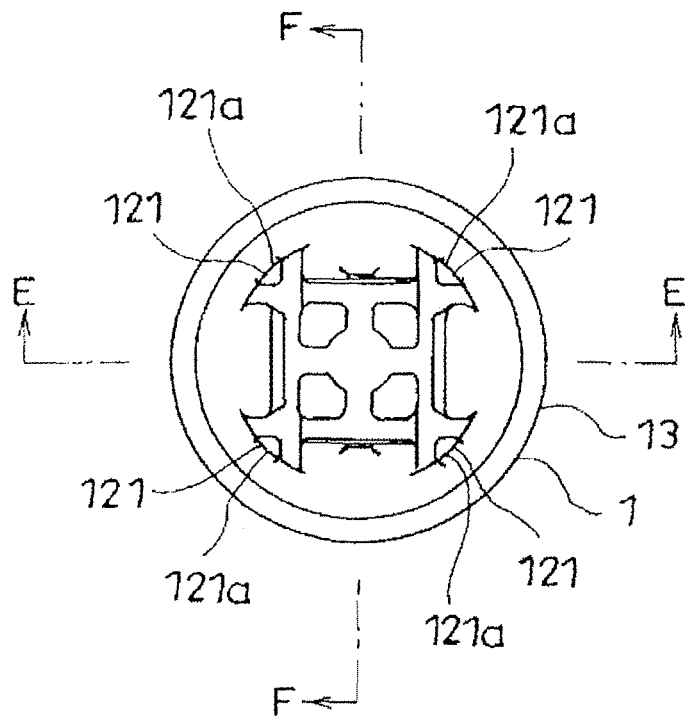
FIG. 19 is a bottom plan view of the axis body forming the grommet.
Figure 20:
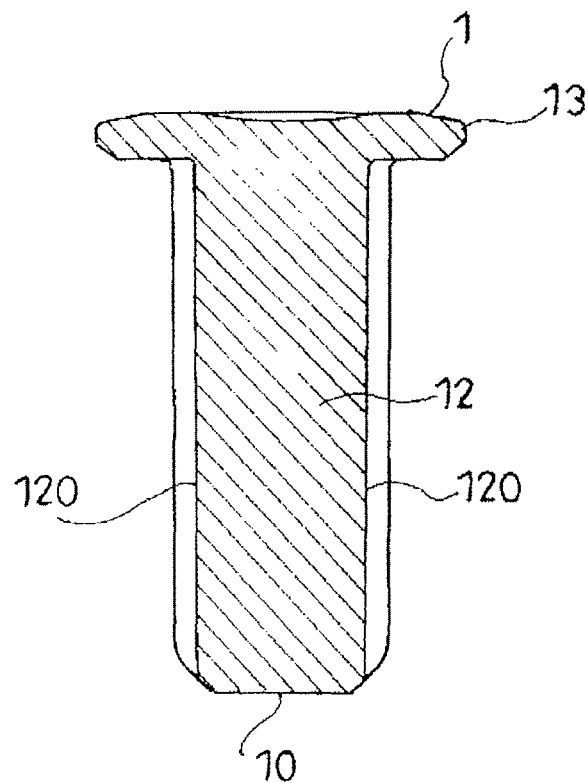
FIG. 20 is a cross-sectional view of the axis body in a corresponding position taken along a line E-E in FIG. 19.
Figure 21:
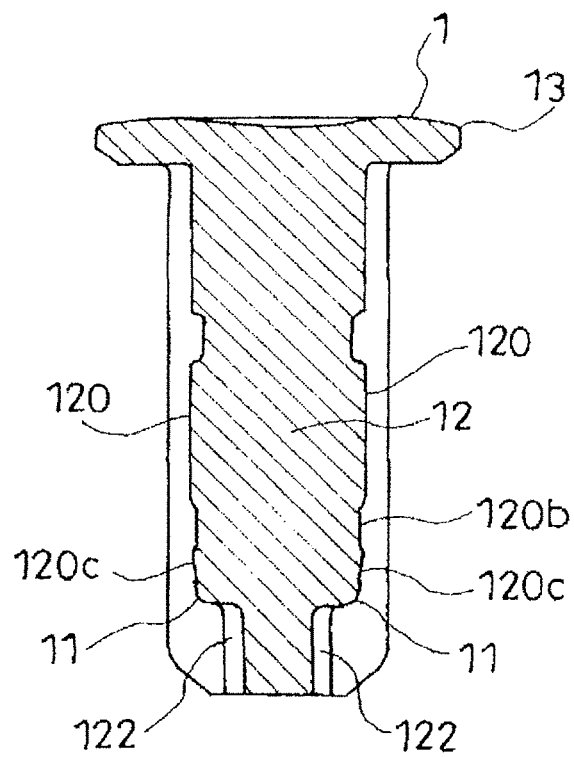
FIG. 21 is a cross-sectional view of the axis body in a corresponding position taken along a line F-F in FIG. 19.

Hereinafter, based on FIG. 1 to FIG. 22, a typical embodiment of the invention will be explained. A grommet according to the embodiment comprises an axis body 1 and a main body 2 wherein the axis body 1 is pushed in. From a state wherein a leg portion 21 of the main body 2 is inserted and passed through a through-hole Pa formed in a fastening object P, the axis body 1 is pushed into the main body 2, so that such leg portion 21 is spread so as to be fastened to such fastening object P. Typically, in such grommet, from a state wherein a plurality of the fastening objects P, respectively having the through-holes Pa, is overlapped in such a way that the through-holes Pa are communicated into each other, the leg portion 21 of the main body 2 is inserted and passed through the through-holes Pa so as to be spread as mentioned above. Accordingly, the grommet is used for fastening such plurality of the fastening objects P to each other through the grommet. (FIGS. 7(a) and 7(b))

The main body 2 includes a head portion 20, and comprises the leg portion 21 which is spread by an elastic deformation by the axis body 1 pushed in from the head portion 20 side.

In an illustrated example, the head portion 20 is structured to form a circular disk shape whose outer diameter is enlarged more than the through-hole Pa. On the other hand, the leg portion 21 is structured to have a thickness which can be inserted and passed through such through-hole Pa.

The leg portion 21 integrally connects a leg base portion 211 to one surface of the head portion 20, and protrudes in a direction orthogonal to the one surface. In the illustrated example, in the head portion 20, there is formed a receiving hole 20a of the approximately circular axis body 1. The leg portion 21 comprises four elastic leg pieces 214, 214, ... with the same size and the same shape, having wide inner and outer surfaces and forming a slender plate shape. In the leg portion 21, a receiving space 213 of the axis body 1 surrounded by the four elastic leg pieces 214, 214, ... is communicated into the receiving hole 20a. Each elastic leg piece 214 is integrally connected to a protruding end of a connecting portion 215 whose one end protrudes inward from a hole edge portion of the receiving hole 20a, respectively. Each elastic leg piece 214 is arranged to form the leg base portion 211 by the one end, and to form a leg terminal 212 of the leg portion 21 by the other end thereof. An approximately equal interval is formed between the adjacent elastic leg pieces 214. The connecting portion 215 is structured to have an approximately an equal width to the elastic leg piece 214.

Also, on the other end side of each elastic leg piece 214, there is respectively formed a protruding portion 216 protruding to an inner side of the leg portion 21. The receiving space 213 narrows on a leg terminal 212 side of the leg portion 21 by the protruding portion 216 of each elastic leg piece 214. The protruding portion 216 comprises an inclined surface 216a facing the head portion 20 side. Between a top portion 216b of the protruding portion 216 and the other end of the elastic leg piece 214, there is a planar surface 216c parallel to a central line, which is not shown in the figures, of the leg portion 21. Also, on the outer surface of each elastic leg piece 214, there is formed an inclined guide face 214a in a direction of narrowing an outer diameter of the leg portion 21 as the inclined guide face 214a goes toward the other end, on the other end side. By the inclined guide face 214a, the leg portion 21 of the main body 2 can be smoothly inserted and passed through the through-hole Pa of the fastening object P.

Also, an outline shape of a horizontal cross-sectional surface of such a leg portion 21 approximately follows a circular arc of an imaginary circle outside the leg portion 21. Also, the outline shape of the horizontal cross-sectional surface of the leg portion 21 approximately follows sides of an imaginary square inside the leg portion 21. Namely, in each elastic leg piece 214, the outer surface thereof is a curved face 214b which follows the circular arc of the imaginary circle, and also the inner surface thereof is a planar surface 214c which follows the sides of the imaginary square. (FIG. 3, FIG. 10, and FIG. 11) Thereby, in the example, in contrast to a case wherein the outline shape of the horizontal cross-sectional surface of the leg portion 21 is structured to follow the circular arc of the imaginary circle in both inside and outside, the leg portion 21 can be easily spread by the elastic deformation by pushing the axis body 1 in.

On the other hand, as an abutted portion of the protruding portion 216 of the leg portion 21 by the aforementioned push-in, the axis body 1 comprises a first abutting portion 10 abutting against the abutted portion; and a second abutting portion 11 positioned on a push-in backward side more than the first abutting portion 10. Then, after one portion of the leg portion 21 is spread by such first abutting portion 10, the axis body 1 is pushed in further, so that the second abutting portion 11 abuts against the abutted portion, and the other one portion of the leg portion 21 is spread.

Namely, although one portion of the axis body 1 is housed inside the main body 2, and the axis body 1 and the main body 2 are temporarily attached by the later-mentioned temporary attaching device, in a state wherein the first abutting portion 10 of the axis body 1 does not abut against the abutted portion (hereinafter, called a position before the push-in), the leg portion 21 does not elastically deform. (FIGS. 4(a) and 4(b)) Next, when the axis body 1 is pushed in up to a position of abutting the first abutting portion 10 against the abutted portion, only one portion of the leg portion 21 is spread by the elastic deformation. In the illustrated example, at that time, among the four elastic leg pieces 214, 214, . . . forming the leg portion 21, only two elastic leg pieces 214, which are located in a back-to-back position, are warped to an outside. (FIGS. 5(a) and 5(b)) Then, until one portion of the leg portion 21 is completely spread, the remaining two elastic leg pieces 214, which become the other one portion of the leg portion 21, do not produce the elastic deformation. Then, when the axis body 1 is pushed in up to a position of abutting the second abutting portion 11 against the abutted portion, the remaining two elastic leg pieces 214, which become the other one portion of the leg portion 21, are spread by the elastic deformation. (FIGS. 6(a) and 6(b), and FIGS. 7(a) and 7(b)) Thereby, the grommet clamps the fastening object P between the head portion 20 and the leg portion 21 so as to be fastened to the fastening object P.

Figure 22:
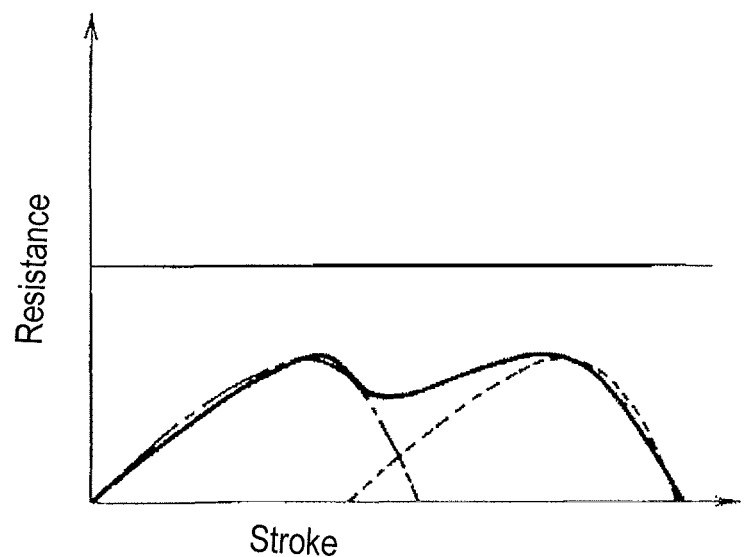
FIG. 22 is a conceptual diagram showing a correlation between a push-in stroke amount of the axis body and a push-in resistance in the grommet according to the invention.

The grommet according to the embodiment dose not allow one portion of the leg portion 21 of the main body 2, and the other one portion to be spread at the same time, so that in a final fastened state, while one portion and the other one portion of such leg portion 21 are being spread together, a push-in resistance of the axis body 1 into the main body 2 can be controlled below a certain value. FIG. 22 shows a concept thereof. In FIG. 22, a horizontal axis represents a push-in stroke amount of the axis body 1, and as the horizontal axis goes to the right, the stroke amount increases. A vertical axis represents a push-in resistance force. In FIG. 22, an alternate long and short dash line represents a push-in resistance force which is considered to be produced from one portion of the leg portion 21 of the main body 2; a broken line represents a push-in resistance force which is considered to be produced from the other one portion of the leg portion 21 of the main body 2; and a solid line represents a combined resistance force of the two resistance forces.

Specifically, the axis body 1 comprises a main body portion 12 forming an approximately rectangular column shape, and a circular-disk-shaped portion 13. One end of the main body portion 12 is integrally connected to one surface of the circular-disk-shaped portion 13. The main body portion 12 is structured to have a thickness capable of being inserted into the receiving space 213 of the leg portion 21 through the receiving hole 20a of the main body 2. The circular-disk-shaped portion 13 has an outer diameter larger than the thickness of the main body portion 12 so as to be capable of pushing the axis body 1 into the main body 2 up to a position wherein the circular-disk-shaped portion 13 collides against the other surface of the head portion 20 of the main body 2. In a position wherein the axis body 1 has been completely pushed into the main body 2, the receiving hole 20a is blocked by the circular-disk-shaped portion 13.

In the main body portion 12 of the axis body 1, a horizontal cross-sectional shape thereof is structured approximately similar to the imaginary square in each portion of the main body portion 12. Namely, the main body portion 12 of the axis body 1 comprises four lateral face portions 120, 120, . . . . In the illustrated example, corner portions 121 located between lateral face portions 120 are structured to form a rib shape long continuing in an axis direction of the axis body 1. Each lateral face portion 120 is located between right-and-left corner portions 121 and 121, and presents a groove shape. A distance between the right-and-left corner portions 121 and 121 approximately corresponds to a width size of the elastic leg piece 214. In the illustrated example, in a state wherein each elastic leg piece 214 is housed in the right-and-left corner portions 121 and 121 respectively surrounding one lateral face portion 120, the axis body 1 is introduced to the receiving space 213 from the other end side through the receiving hole 20a. (FIG. 3) Therefore, in a state wherein the axis body 1 and the main body 2 are combined, the corresponding corner portion 121 of the axis body 1 is respectively housed between the adjacent connecting portions 215 and 215 inside the head portion 20. A distance between two lateral face portions 120 and 120, which are located in a back-to-back position, of the axis body 1 approximately corresponds to a distance between the inner surfaces structured as the aforementioned planar surfaces 214c in the two elastic leg pieces 214 and 214, which are located in an opposed position, of the leg portion 21 of the main body 2.

In the other end side which becomes a push-in end in the main body portion 12 of the axis body 1, there are formed concave portions 122 which are formed to open up to an outside in the other end of the axis body 1 between the adjacent corner portions 121, and which move a terminal 120a of the lateral face portion 120 backward to the push-in backward side of the axis body 1 from the other end of the main body portion 12. In the illustrated example, by such concave portions 122, the two lateral face portions 120, which are located in the back-to-back position, among the four lateral face portions 120, 120, . . . of the main body portion 12, move the terminal 120a thereof backward to the push-in backward side of the axis body 1. Namely, the main body portion 12 respectively has the concave portions 122 in the back-to-back position. A distance between bottom faces of the concave portions 122 and 122 at two places is made smaller than a distance between the protruding portions 216 of the two elastic leg pieces 214 which constitute the leg portion 21 of the main body 2, and which are located in the opposed position.

Namely, in the embodiment, the second abutting portion 11 is structured by the terminal of the lateral face portion 120 wherein the terminal 120a is moved backward by such concave portion 122. Also, the first abutting portion 10 is structured by the terminal 120a of the remaining lateral face portions 120. Thereby, in the embodiment, between a formation place of the first abutting portion 10 and a formation place of the second abutting portion 11 in such axis body 1, there is created a gap for a certain amount of angle in a circumferential direction of the axis body 1. In the illustrated example, the second abutting portion 11 is formed in a position which differs by 90 degrees relative to the first abutting portion 10.

In the embodiment, a terminal portion is projected to an outside as an engaging portion 120c more than an intermediate portion 120b of the lateral face portion 120 wherein the terminal 120a is moved backward by the concave portion 122. The elastic leg piece 214, which has been spread by the protruding portion 216 abutting against the second abutting portion 11, slightly bends to return at a position wherein the top portion 216b of the protruding portion 216 has exceeded the terminal portion, and the top portion 216b is caught on the engaging portion 120c. (FIGS. 7(a) and 7(b))

Also, in the embodiment, the grommet comprises the temporary attaching device temporarily attaching the axis body 1 and the main body 2 before the push-in position wherein one portion of the axis body 1 is housed inside the main body 2. Also, the temporary attaching device is formed as latch-engaging portions 14 which are located between the lateral face portion 120 wherein the first abutting portion 10 is positioned, and the lateral face portion 120 wherein the second abutting portion 11 is positioned, in a direction around an axis line of the axis body 1. Also, the latch-engaging portions 14 are latched and engaged relative to latch-engaged portions 20b formed inside the head portion 20 of the main body 2. In the embodiment, such latch-engaging portions 14 are formed in the corner portions 121 positioned between the lateral face portion 120 wherein the first abutting portion 10 is positioned, and the lateral face portion 120 wherein the second abutting portion 11 is positioned.

Thereby, in the embodiment, in a portion which has no impact on the spread of the leg portion 21 of the main body 2, the main body 2 and the axis body 1 can be in a state of not being separated even in a stage before the leg portion 21 of the main body 2 is spread.

Also, in the embodiment, in the position wherein the axis body 1 has been completely pushed into the main body 2, the axis body 1 is additionally provided with additional latch-engaging portions 15 which are latched and engaged with the latch-engaged portions 20b. Thereby, in the embodiment, a state wherein the leg portion 21 of the main body 2 has been completely spread can be stably maintained by a latch and engagement with such latch-engaged portions 20b and additional latch-engaging portions 15.

Such latch-engaging portions 14 and additional latch-engaging portions 15 are respectively provided in the corner portions 121 of the main body portion 12 of the axis body 1. Therefore, the additional latch-engaging portions 15 are positioned on the push-in backward side of the axis body 1 more than the latch-engaging portions 14. On the other hand, the latch-engaged portion 20b is the hole edge portion of the receiving hole 20a in the head portion 20 of the main body 2, and is respectively provided in a portion positioned between the adjacent connecting portions 215.

In the illustrated example, in the corner portion 121 of the main body portion 12 of the axis body 1, there are respectively formed grooves 121a along a push-in direction of the axis body 1. Inside the groove 121a, there are formed raised portions 121b at three places leaving intervals up and down in the push-in direction. Then, a portion between the raised portion 121b positioned on a push-in end side of the axis body 1 and the intermediate raised portion 121b becomes the latch-engaging portion 14. Also, a portion between the raised portion 121b positioned on the push-in backward side and the circular-disk-shaped portion 13 becomes the additional latch-engaging portion 15.

Also, in the illustrated example, between the adjacent connecting portions 215 and 215 of the main body 2, there are respectively formed protruding portions 20c protruding toward the center of the receiving hole 20a. The protruding portion 20c is structured to have a size which can fit in the groove 121a. Also, a distance between a pair of the protruding portions 20c and 20c facing each other across the center of the receiving hole 20a of the main body 2 approximately corresponds to a distance between the grooves 121a positioned on an imaginary straight line passing through the center of the axis body 1. Then, when the axis body 1 is introduced into the main body 2 from the other end side of the main body portion 12, at a position just before the protruding portion 216 of the elastic leg piece 214 is contacted with the first abutting portion 10, the protruding portion 20c inside the head portion 20 enters into the latch-engaging portion 14 so as to be latched and engaged. (A temporary attached state) Then, from the temporary attached state, when the axis body 1 is completely pushed into the main body 2, the protruding portion 20c inside the head portion 20 enters into the additional latch-engaging portion 15 so as to be latched and engaged. Namely, in the embodiment, the latch-engaging portion 14 and the additional latch-engaging portion 15 are concave portions, and the protruding portion 20c functions as the latch-engaged portion 20b.

In the illustrated example, between a formation position of the protruding portion 20c in the head portion 20 of the main body 2 and an edge portion of the head portion 20, there are formed split grooves 20d continuing in a direction around the center of the head portion 20. Due to the split grooves 20d, a formation place of the protruding portion 20c can elastically deform. When the axis body 1 is introduced into the main body 2 from the other end side of the main body portion 12, the protruding portion 20c abuts against the raised portion 121b positioned on the push-in end side of the axis body 1, and the formation place of the protruding portion 20c is warped to an outside so as to allow the axis body 1 to be introduced up to a position wherein the protruding portion 20c climbs over the intermediate raised portion 121b. Also, when the protruding portion 20c has climbed over the raised portion 121b, the formation place of the protruding portion 20c bends to return, so that the protruding portion 20c enters into the latch-engaging portion 14 so as to create the aforementioned temporary attached state. From the temporary attached state, when the axis body 1 is pushed into the main body 2, the protruding portion 20c abuts against the aforementioned intermediate raised portion 121b, and the formation place of the protruding portion 20c is warped to the outside so as to allow the axis body 1 to be introduced up to the position wherein the protruding portion 20c climbs over the intermediate raised portion 121b. Also, when the axis body 1 is pushed into the main body 2 further, the protruding portion 20c abuts against the raised portion 121b positioned on the aforementioned push-in backward side, and the formation place of the protruding portion 20c is warped to the outside again so as to allow the axis body 1 to be introduced up to the position wherein the protruding portion 20c climbs over the raised portion 121b positioned on the push-in backward side. Also, when the protruding portion 20c has climbed over the raised portion 121b, the formation place of the protruding portion 20c bends to return, so that the protruding portion 20c enters into the additional latch-engaging portion 15.

In the illustrated example, the raised portion 121b positioned on the push-in end side of the axis body 1 has an inclined surface 121c gradually rising as it goes toward the push-in backward side on a lateral face which faces the push-in end side, and the protruding portion 20c which becomes the latch-engaged portion 20b can smoothly climb over the raised portion 121b. Also, the aforementioned intermediate raised portion 121b and the raised portion 121b positioned on the push-in backward side in the axis body 1 has also an inclined surface 121c gradually rising as it goes toward the push-in backward side on a lateral face which faces the push-in end side of the axis body 1. Also, the protruding portion 20c which becomes the latch-engaged portion 20b can smoothly climb over the intermediate raised portion 121b as well. Namely, in the embodiment, among an inner wall of the concave portion which becomes the latch-engaging portion 14, an inner wall positioned on an additional latch-engaging portion 15 side has an inclination wherein the concave portion, which becomes the latch-engaging portion 14, becomes shallow as it goes closer to the additional latch-engaging portion 15 side.

Incidentally, to provide an elastic deformational characteristic in the grommet explained above, the elastic deformational characteristic can be easily provided by forming the grommet entirely or partly by synthetic resin.

Incidentally, all contents of the specification, claims, drawings, and abstract of Japanese Patent Application No. 2010-151057 filed on Jul. 1, 2010 are cited herein and are incorporated as a disclosure of the specification of the present invention.

What is claimed is:

1. A grommet comprising:
    an axis body including first and second lateral face portions, a first abutting portion formed on the first lateral face portion, a second abutting portion arranged above the first abutting portion in an insertion direction of the axis body on the second lateral portion, and a latch-engaging portion arranged at a corner portion formed between the first lateral face portion and the second lateral face portion; and
    a main body including a head portion having a receiving hole, a leg portion extending downwardly from the head portion and split into at least two parts to elastically spread by the axis body pushed in the receiving hole, each of the at least two parts including an abutted portion abutting against the first abutting portion or the second abutting portion, and a latch-engaged portion formed between the at least two parts adjacent each other inside the head portion of the main body,
    wherein the latch-engaging portion latches and engages the latch-engaged portion to attach the axis body and the main body at a position before pushing-in of the leg portion wherein one portion of the axis body is housed inside the main body, and
    when the axis body is pushed in the receiving hole of the main body and the first abutting portion abuts against the abutted portion corresponding thereto, one of the at least two parts abutting against the first abutting portion is spread, and when the axis body is further pushed in the receiving hole of the main body and the second abutting portion abuts against the abutted portion corresponding thereto, another of the at least two parts abutting against the second abutting portion is spread.

2. A grommet according to claim 1, wherein the axis body includes an additional latch-engaging portion which is latched and engaged with the latch-engaged portion at a position wherein the axis body is completely pushed into the main body.

3. A grommet according to claim 2, wherein the latch-engaging portion and the additional latch-engaging portion are concave portions, and the latch-engaged portion is a protruding portion.

4. A grommet according to claim 3, wherein the latch-engaging portion and the additional latch-engaging portion respectively include inner walls to form the concave portions, the inner wall of the latch-engaging portion extending toward the additional latch-engaging portion has an inclination such that the concave portion of the latch-engaging portion has a depth to be shallow in a direction toward the additional latch-engaging portion.

5. A grommet, comprising:
    an axis body including a latch-engaging portion; and
    a main body including a head portion having a receiving hole, a leg portion extending downwardly from the head portion and split into at least two parts to be elastically spread by the axis body being pushed in the receiving hole, and a latch-engaged portion arranged at an edge portion of the receiving hole between the at least two parts and apart from an end portion of each of the at least two parts in a width direction thereof,
    wherein the latch-engaging portion latches and engages the latch-engaged portion to temporarily attach the axis body and the main body at a position before pushing-in of the leg portion wherein one portion of the axis body is housed inside the main body;
    the head portion includes connecting portions protruding inwardly from an inner edge portion of the head portion, and the leg portion extending downwardly from the connecting portions; and
    the latch-engaged portion protrudes toward a center of the receiving hole between the connecting portions.

6. A grommet, comprising:
    an axis body including a latch-engaging portion; and
    a main body including a head portion having a receiving hole, a leg portion extending downwardly from the head portion and split into at least two parts to be elastically spread by the axis body being pushed in the receiving hole, and a latch-engaged portion arranged at an edge portion of the receiving hole between the at least two parts and apart from an end portion of each of the at least two parts in a width direction thereof,
    wherein the latch-engaging portion latches and engages the latch-engaged portion to temporarily attach the axis body and the main body at a position before pushing-in of the leg portion wherein one portion of the axis body is housed inside the main body; and
    the head portion includes a split groove portion formed outside the latch-engaged portion in a radial direction of the head portion to elastically outwardly deform the latch-engaged portion.

7. A grommet according to claim 1, wherein the axis body includes an additional latch-engaging portion arranged above the latch-engaging portion in the insertion direction of the axis body, and latches and engages the latch-engaged portion when the axis body is completely pushed into the receiving hole of the main body.

8. A grommet according to claim 1, wherein the second lateral face portion has a length shorter than that of the first lateral face portion in the insertion direction of the axis body; and
    the first and second abutting portions are respectively formed at one end portions of the first lateral face portion and the second lateral portion such that the first and second abutting portions sequentially abut against the abutted portions.

* * * * *